(12) United States Patent
Sinclair

(10) Patent No.: US 8,079,009 B1
(45) Date of Patent: Dec. 13, 2011

(54) MANAGING INTERRUPT REQUESTS FROM IP CORES

(75) Inventor: Martin Sinclair, Eskbank (GB)

(73) Assignee: Xilinx, Inc., San Jose, CA (US)

( * ) Notice: Subject to any disclaimer, the term of this patent is extended or adjusted under 35 U.S.C. 154(b) by 449 days.

(21) Appl. No.: 12/329,881

(22) Filed: Dec. 8, 2008

(51) Int. Cl.
G06F 17/50 (2006.01)

(52) U.S. Cl. .......................... 716/126; 716/101; 716/111

(58) Field of Classification Search .................. 716/101, 716/111, 126
See application file for complete search history.

(56) References Cited

U.S. PATENT DOCUMENTS

| | | | |
|---|---|---|---|
| 5,717,942 A | 2/1998 | Haupt et al. | |
| 6,028,446 A | 2/2000 | Agrawal et al. | |
| 6,195,774 B1 | 2/2001 | Jacobson | |
| 6,647,508 B2 | 11/2003 | Zalewski et al. | |
| 6,766,389 B2 * | 7/2004 | Hayter et al. | 710/62 |
| 6,857,110 B1 | 2/2005 | Rupp et al. | |
| 7,028,270 B1 | 4/2006 | Lam et al. | |
| 7,235,999 B2 | 6/2007 | Goetting et al. | |
| 7,337,422 B1 | 2/2008 | Becker et al. | |
| 7,389,489 B1 | 6/2008 | Chesal et al. | |
| 7,552,415 B2 * | 6/2009 | Sanchez et al. | 716/138 |
| 7,594,211 B1 | 9/2009 | Tian et al. | |
| 2005/0094446 A1 | 5/2005 | Terazawa et al. | |
| 2005/0169318 A1 | 8/2005 | Minemura et al. | |
| 2008/0244491 A1 | 10/2008 | Ganesan et al. | |

OTHER PUBLICATIONS

U.S. Appl. No. 12/140,506, filed Jun. 17, 2008, Sinclair et al.
U.S. Appl. No. 12/186,414, filed Aug. 5, 2008, Sinclair et al.

* cited by examiner

*Primary Examiner* — Thuan Do
(74) *Attorney, Agent, or Firm* — Pablo Meles; John J. King; Thomas George

(57) ABSTRACT

A system and method of managing interrupt requests from IP cores within an integrated circuit design can include capturing environmental constraints within constraint files for the integrated circuit design (where the constraints can include information regarding a board upon which an integrated circuit device is mounted, pin locations for interrupt signals, and the sensitivity of the interrupt signals), generating connections among interrupt sources, interrupt controllers, and interrupt request ports on microprocessor cores within a device environment, and automatically instantiating controller logic when interrupt controllers are lacking during compilation of the device design. The method and system can also identify within the design, processor and bus interconnections as well as each interrupt port on the IP cores and the sensitivity requirements for each port which can be stored within description files for a corresponding IP core instead of an HDL specification.

20 Claims, 6 Drawing Sheets

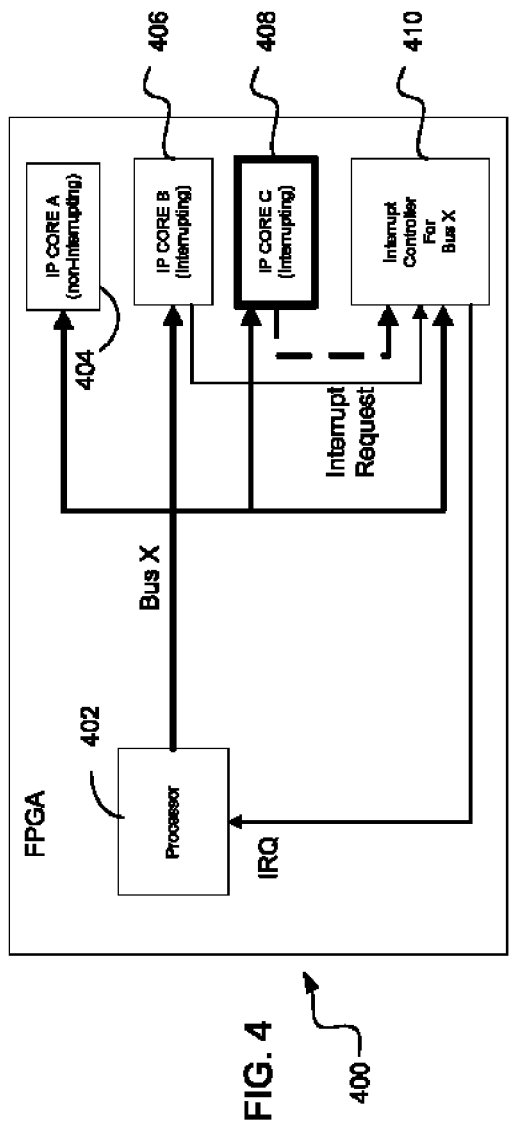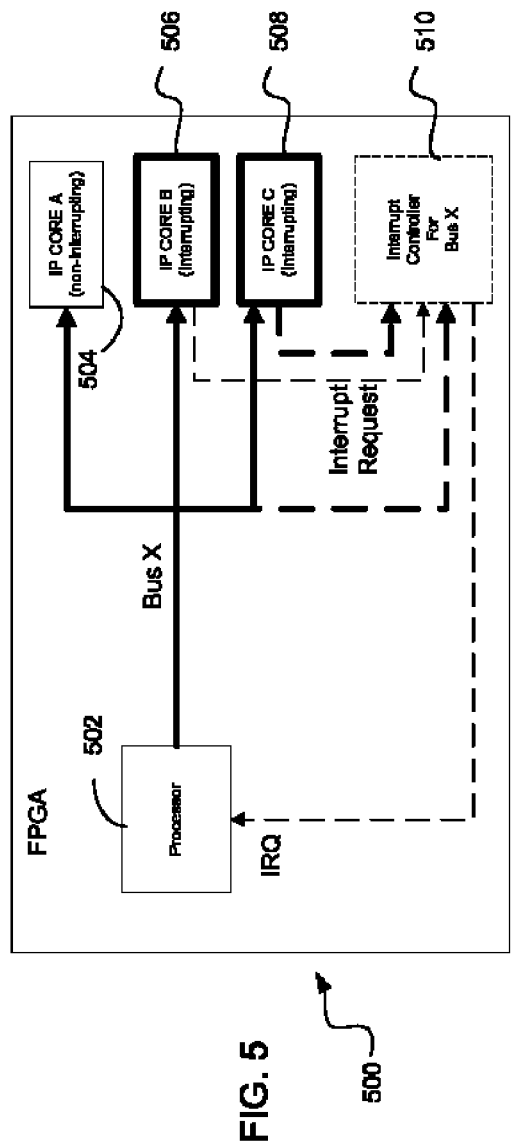
FIG. 4
FIG. 5

MANAGING INTERRUPT REQUESTS FROM IP CORES

FIELD OF THE INVENTION

The invention relates to programmable logic device and application specific integrated circuit (ASIC) design. More particularly, the invention relates to provisioning of appropriate interrupt request in programmable logic device and ASIC designs.

BACKGROUND OF THE INVENTION

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth. As used herein, note that the terms "include" and "including" mean including without limitation.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices (PLDs), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

For purposes of clarity, FPGAs are described below though other types of PLDs may be used as well as ASIC designs can be used. FPGAs may include one or more embedded microprocessors. For example, a microprocessor may be located in an area reserved for it, generally referred to as a "processor block."

Some FPGAs, such as Xilinx's Virtex FGPA, can be programmed to incorporate blocks with pre-designed functionalities, i.e., "cores". A core can include a predetermined set of configuration bits that program the FPGA to perform one or more functions. Alternatively, a core can include source code or schematics that describe the logic and connectivity of a design. Typical cores can provide, but are not limited to, digital signal processing (DSP) functions, memories, storage elements, and math functions. Some cores include an optimally floorplanned layout targeted to a specific family of FPGAs. Cores can also be parameterizable, i.e., allowing the user to enter parameters to activate or change certain core functionality.

The performance of a design instantiated in programmable logic of an FPGA ("FPGA fabric") was premised on seamlessly providing for interrupt requests in PLD or FPGA designs. However, existing tools fail to provision automatically for appropriate interrupt requests and is currently viewed as a problem that should be resolved manually by a system designer.

SUMMARY OF THE INVENTION

One or more aspects of the invention generally relate to managing interrupt requests, and more particularly to managing interrupt requests from intellectual property or IP cores or other external interrupts. In accordance with a first embodiment of the invention, a method of managing interrupt requests to an FPGA design can include capturing FPGA environmental constraints within constraint files for the FPGA design, generating connections among interrupt sources, interrupt controllers, and interrupt request ports on microprocessor cores within an FPGA environment, and automatically instantiating controller logic when interrupt controllers are lacking during compilation of the FPGA design.

In accordance with a second embodiment of the invention, a system can include a controller to instantiate interrupt logic including at least one interrupt controller within hardware descriptions and software descriptions of a Field Programmable Gate Array (FPGA) or ASIC design and to automatically link unconnected interrupt requests to interrupt controller inputs.

In accordance with a third embodiment of the invention, a computer-readable storage medium can include computer instructions for capturing FPGA environmental constraints within constraint files for the FPGA design, generating connections among interrupt sources, interrupt controllers, and interrupt request ports on microprocessor cores within an FPGA environment, and automatically instantiating controller logic when interrupt controllers are lacking during compilation of the FPGA design.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 4 is a block/schematic diagram depicting an exemplary embodiment of an FPGA design having a single unconnected interrupt and having some pre-existing interrupt provision after elaboration.

FIG. 5 is a block/schematic diagram depicting after elaboration where an FPGA design had multiple interrupts on a single bus and processor in accordance with an embodiment of the present invention.

DETAILED DESCRIPTION

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
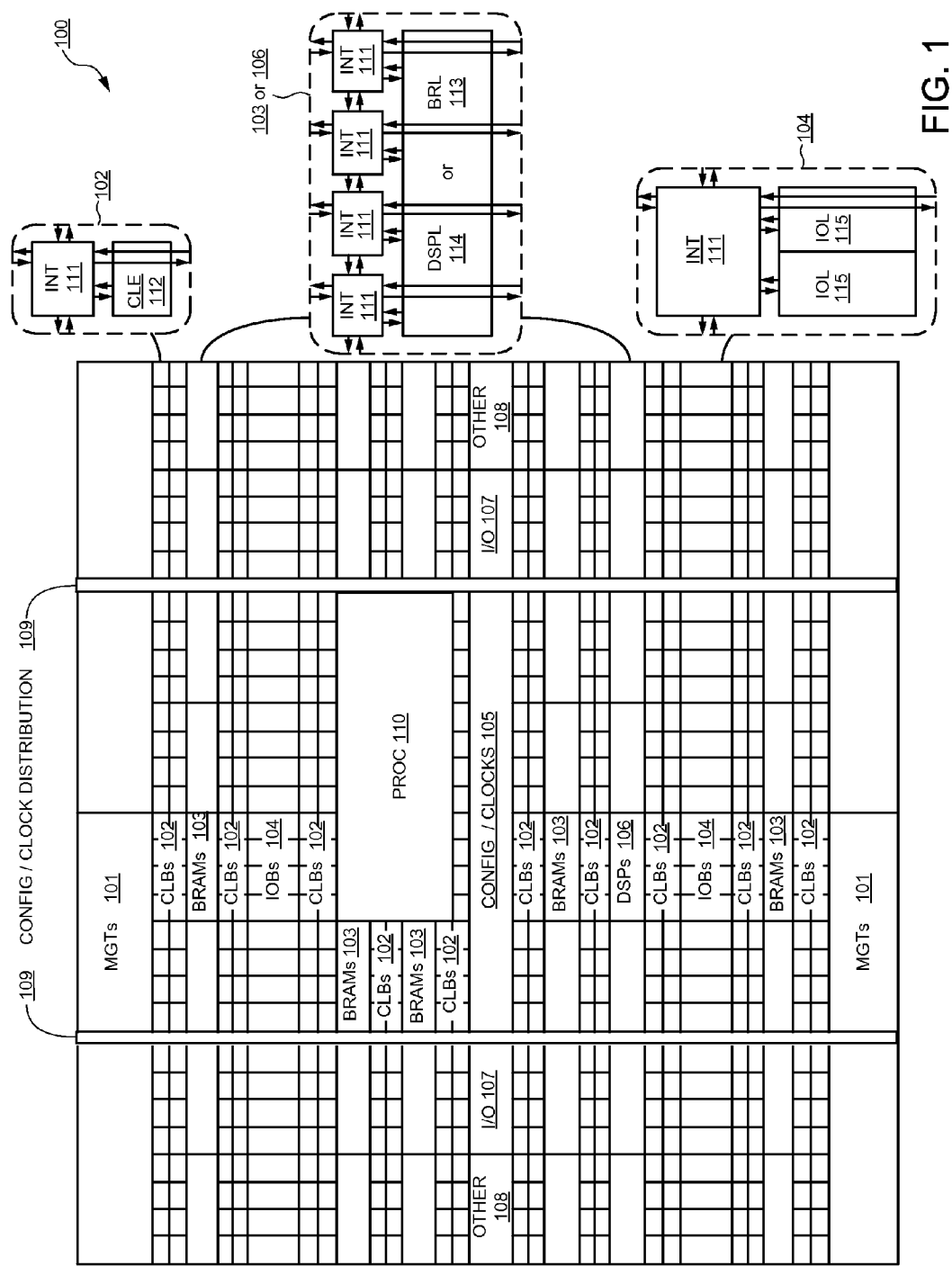
FIG. 1 is a simplified block diagram depicting an exemplary embodiment of a columnar Field Programmable Gate Array ("FPGA") architecture in which one or more aspects of the invention may be implemented.

As noted above, advanced integrated circuit such as FPGAs can include several types of programmable logic blocks in the array. For example, FIG. 1 illustrates an FPGA architecture 100 that includes a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized input/output ports (I/O) 107 (e.g., configuration ports and clock ports), and other programmable logic 108 such as digital clock managers, analog-to-digital converters, system monitoring logic, and so forth. Some FPGAs also include dedicated processor blocks (PROC) 110.

In some FPGAs, each programmable tile includes a programmable interconnect element (INT) 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element (CLE) 112 that can be programmed to implement user logic plus a single programmable interconnect element 111. A BRAM 103 can include a BRAM logic element (BRL 113) in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the right of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA. FPGA 100 illustratively represents a columnar architecture, though FPGAs of other architectures, such as ring architectures for example, may be used. FPGA 100 may be a Virtex-4™ FPGA from Xilinx of San Jose, Calif. Further note, the embodiments herein are not necessarily limited to FPGAs and can be applicable to other PLDs and even ASICs, particularly where system level tools are used to create an ASIC design.

The ability exists to identify interrupt ports in an IP core and on the FPGA boundary, and describe their sensitivity. This information is currently used to assist hardware synthesis tools in checking a design against a set of design rules. Embodiments herein apply an algorithm which uses this information to generate connections between interrupt sources, interrupt controllers, and interrupt request ports on microprocessor cores. Where appropriate interrupt controllers do not exist, interrupt controller logic is instantiated in order to meet the requirements of the system interrupts. The algorithm can provide a solution that can be tailored according to the system design (e.g., where interrupt controllers operated in a strict priority according to input connections).

At the time where designers attempt to compile their design on to an FPGA (within existing workflows), a description of the FPGA's environment should be available. The board upon which the FPGA is mounted has been described, the pin locations for any interrupt signals have been identified, and the sensitivity of those signals is known. This information is captured within constraint files. Note that the constraint files can also include interrupts that can be external to the device or the FPGA (or ASIC) such as interrupts from bus peripherals that would apply to the design (see design 950 of FIG. 9 as an example).

Similarly, processors and bus interconnections have been identified within the design. Each interrupt port on an IP core has been identified and its sensitivity requirement captured, as part of the IP core's description. This information is held within description files for that IP core, rather than as an intrinsic part of the Hardware Description Language specification (e.g., it is no part of the Verilog or VHDL language standards).

In FIGS. 2-8, the cores with unconnected interrupt requests are highlighted with thicker lines. Automatically created connections and logic are marked with dotted lines.

Figure 2:
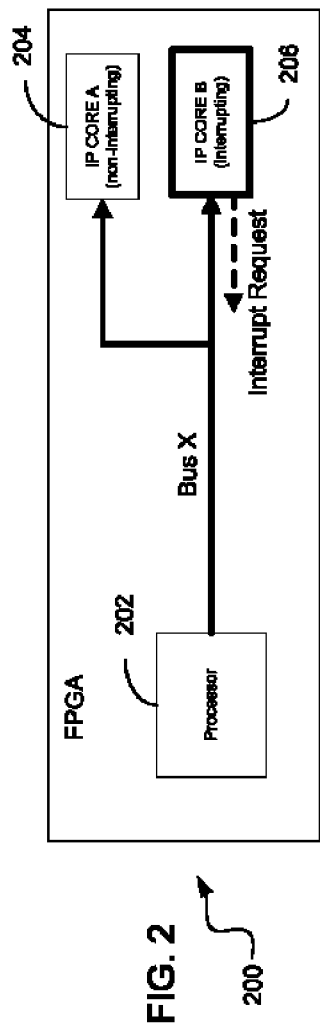
FIG. 2 is a block/schematic diagram depicting an exemplary embodiment of an FPGA design having a single interrupt before elaboration in accordance with an embodiment of the present invention.

Referring to FIG. 2, an FPGA design 200 with a single processor 202 and a single interrupt from an IP Core 206 is illustrated before elaboration (of interrupt controllers and connections). The FPGA also includes a non-interrupting IP core 204. In this simplest form of algorithm, no interrupt provision is made within a design, which contains a single unconnected interrupt request. The design is analyzed to determine whether any unconnected interrupt supplies exist on IP cores. These cores are then examined to see whether they are acting as a processor bus peripheral and the bus is examined to find the processor.

Figure 3:
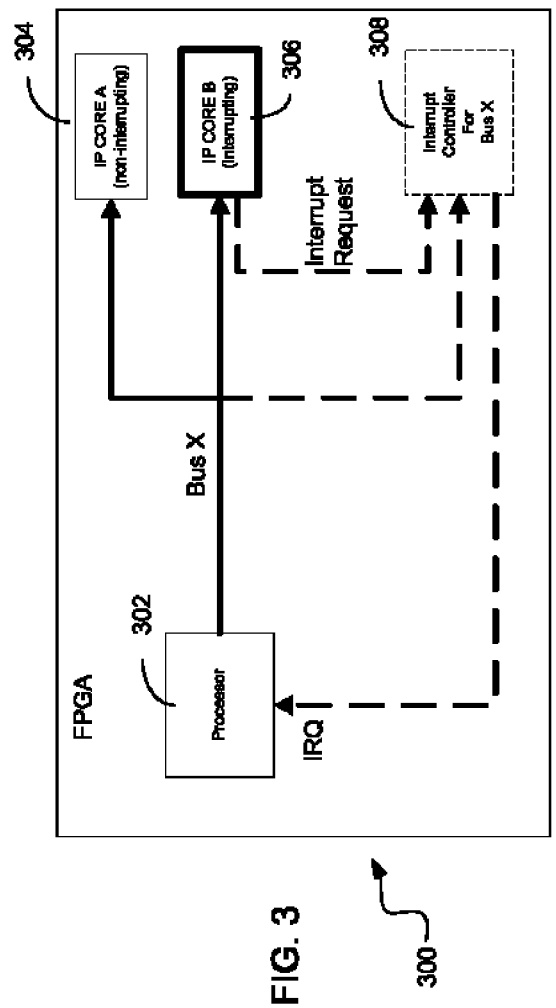
FIG. 3 is a block/schematic diagram depicting an exemplary embodiment of the FPGA design of FIG. 2 after elaboration and provisioning of appropriate interrupts in accordance with an embodiment of the present invention.

Referring to FIG. 3, the FPGA design 200 is illustrated after elaboration as FPGA design 300 with processor 302, non-interrupting IP core 304 and the interrupting IP core 306. Once the presence of an interrupt request has been determined, an interrupt controller 308 is identified which is compatible with the bus logic which lies between the interrupting IP core 306 and the processor 302. The controller is then instantiated within the design 300 and connected to the bus logic, the interrupt input on the processor, and the interrupt request output on the IP core 306. Where software description of the system is present, the controller's driver is added to the list of available drivers within the software system, as a member of the appropriate bus. And the interrupt is added to any description of system interrupts.

Referring to FIG. 4, an FPGA design 400 is illustrated after elaboration where a single unconnected interrupt is needed and some existing interrupt provisioning is already included within the design. An example of this is where an IP core has recently been added to an existing design, but not fully connected. Thus, the FPGA design 400 can include a processor 402, a non interrupting IP core 404 and a interrupting IP core 406 already connected to an interrupt controller 410. When an additional interrupting IP core 408 is added, and the unconnected interrupt from IP core 408 is connected to the existing interrupt controller 410.

The embodiment of FIG. 4 illustrates a refinement of the algorithm in that the algorithm examines the design to determine whether there is an existing interrupt controller for the processor on the bus (bus X). If so, the existing logic is reused, and the unconnected interrupt is connected to the existing interrupt controller on the next available interrupt request input. The input interrupt controller is re-parameterized as necessary (e.g., a "number of inputs" parameter used to control the width of an input vector is incremented).

Referring to FIG. 5, an FPGA design 500 is illustrated after elaboration where an FPGA design has multiple unconnected interrupts and no interrupts provisioning. This refinement enables multiple unconnected interrupts to be resolved and uses the techniques described with respect to FIGS. 3 and 4. In this design, a processor 502 and a non-interrupting IP core 504 is provided. Unconnected IP cores 506 and 508 need a connection to an interrupt controller. Thus, in this iteration, the resolution of the first unconnected interrupt request (e.g., from IP Core 506) results in the instantiation and connection of the interrupt controller 510. Resolution of the remaining unconnected interrupt requests (e.g., from IP core 508) reuses the newly-created interrupt logic.

Figure 6:
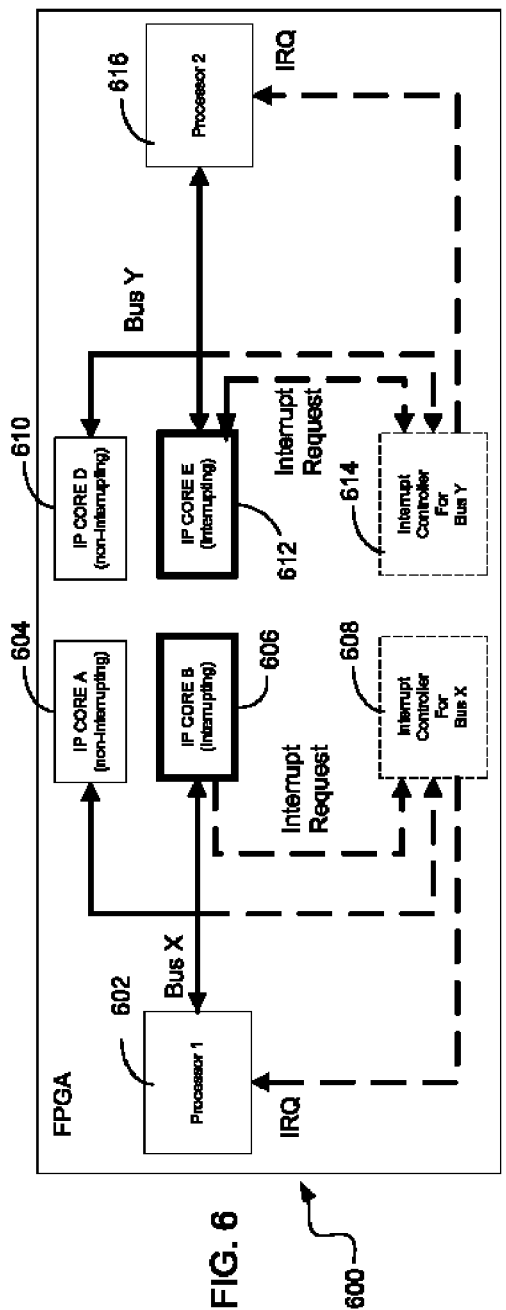
FIG. 6 is a block/schematic diagram depicting after elaboration where an FPGA design had multiple processors each having a single bus and respective interrupts in accordance with an embodiment of the present invention.

Referring to FIG. 6, an FPGA design 600 is illustrated after elaboration where the FPGA design utilizes multiple processors. In this instance, a processor 602 is associated with a non-interrupting IP core 604 and an (unconnected before elaboration) IP core 606 via a first bus X. Similarly, a second processor 616 is associated with a non-interrupting IP core 610 and an (unconnected before elaboration) IP core 612 via a second bus Y. In multiprocessor environments, cores with unconnected interrupt requests are examined for the presence of a connection to a bus with a processor. The interrupt request is then resolved for that respective bus. In this instance, an interrupt controller 608 is instantiated for Bus X and appropriated connections are made between IP core 606, interrupt controller 608 and processor 602 as illustrated. Similarly, an interrupt controller 614 is instantiated for Bus Y and appropriated connections are made between IP core 6012, interrupt controller 614 and processor 616 as illustrated.

Figure 7:
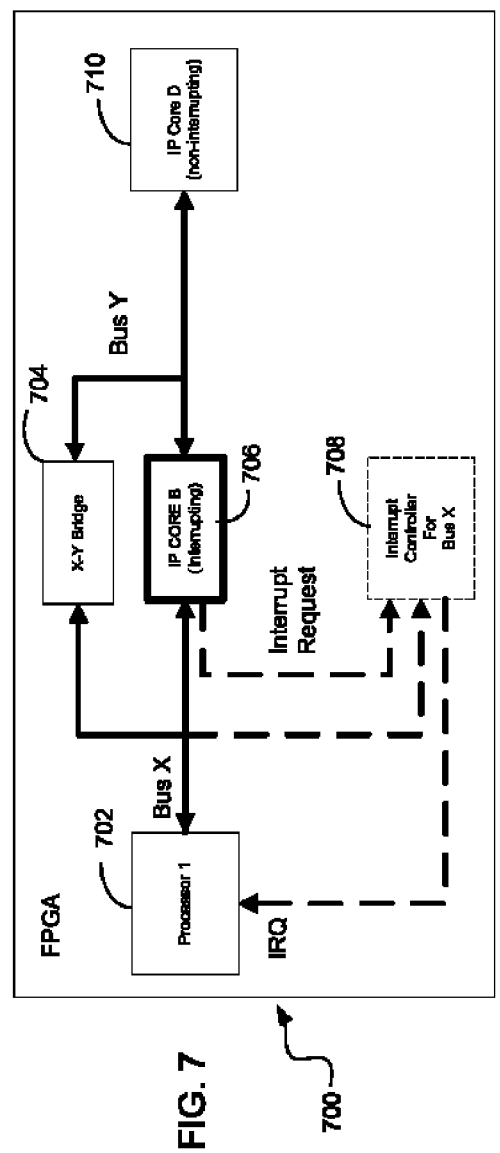
FIG. 7 is a block/schematic diagram depicting after elaboration where an FPGA design had multiple buses and a single interrupt in accordance with an embodiment of the present invention.

Referring to FIG. 7, another FPGA design 700 is shown having multiple buses (X and Y) sharing the same processor 702. The processor 702 in connected via a bridge 704 to non interrupting IP core 710 and directly connected to interrupting IP core 706. Where multiple routes exist to the same processor, the algorithm will only allow a single route for an interrupt controller 708. Where the IP core is connected to a bus with an existing interrupt controller, this shall take precedence. Direct bus connection shall then take precedence over bridged connections.

Figure 8:
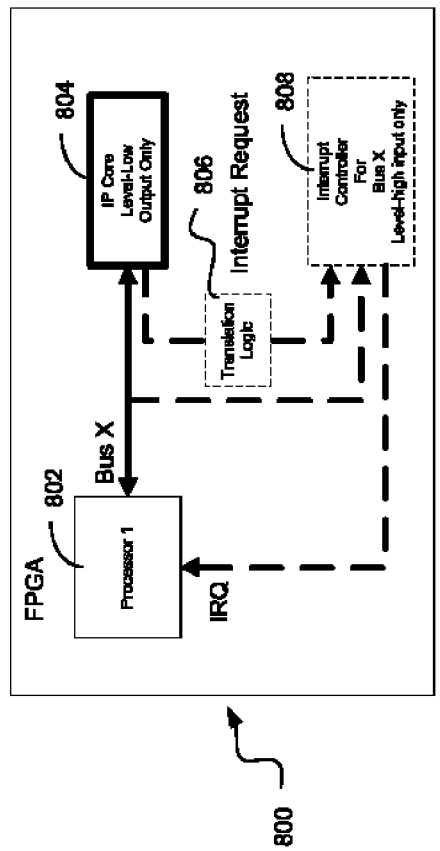
FIG. 8 is a block/schematic diagram depicting after elaboration where an FPGA design had interrupt controllers and interrupt requests with different sensitivities and translation logic used to reconcile in accordance with an embodiment of the present invention.

Referring to FIG. 8, an FPGA design 800 illustrates a design after elaboration where interrupt format conversion is provisioned in a design including a processor 802. It is possible that the interrupt controller and the interrupt request have different sensitivities such as when the interrupt controller inputs are level-high for an interrupt controller 808 and the interrupt request is level-low from an interrupting IP core 804. The algorithm should match the two signals so that they have identical sensitivities. Where the two signals are not identical, one or other should be modified to match. Where both sensitivities are parameterizable, the IP core 804 should be parameterized in preference to the interrupt controller 808, and the interrupt controller 808 left in its default state. Where the interrupt controller sensitivity is considered for modification, existing interrupt requests are checked to ensure that they will not be invalidated. Where the interrupt request output and the interrupt controller input sensitivities cannot be matched by parameterization of the cores concerned, translation logic 806 can be inserted to translate the output to the appropriate input.

Figure 9:
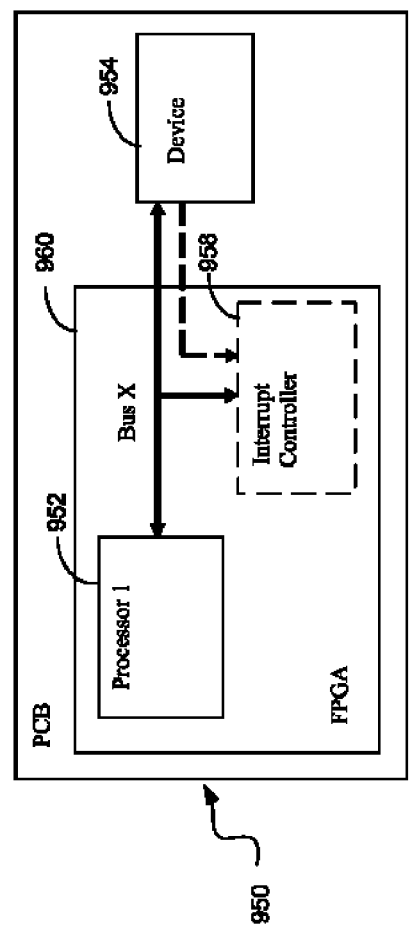
FIG. 9 is a block/schematic diagram depicting an exemplary embodiment of an FPGA design on a printed circuit board having an external device to the FPGA that can provide an interrupt on a bus in accordance with an embodiment of the present invention.

Referring to FIG. 9, an FPGA assembly design 950 including an FPGA 960 and an external device 954 mounted on a PCB is shown. The external device 954 can be defined within constraint files and can include interrupts that can be external to the device or the FPGA (or ASIC) such as interrupts from bus peripherals that would apply to the design. The design 950 can also include a processor 952. Once the presence of an interrupt request has been determined, an interrupt controller 958 is identified which is compatible with the bus logic which lies between the interrupting external device 954 and the processor 952. The controller is then instantiated within the design 950 and connected to the bus logic, the interrupt input on the processor, and the interrupt request output on the external device 954.

Figure 10:
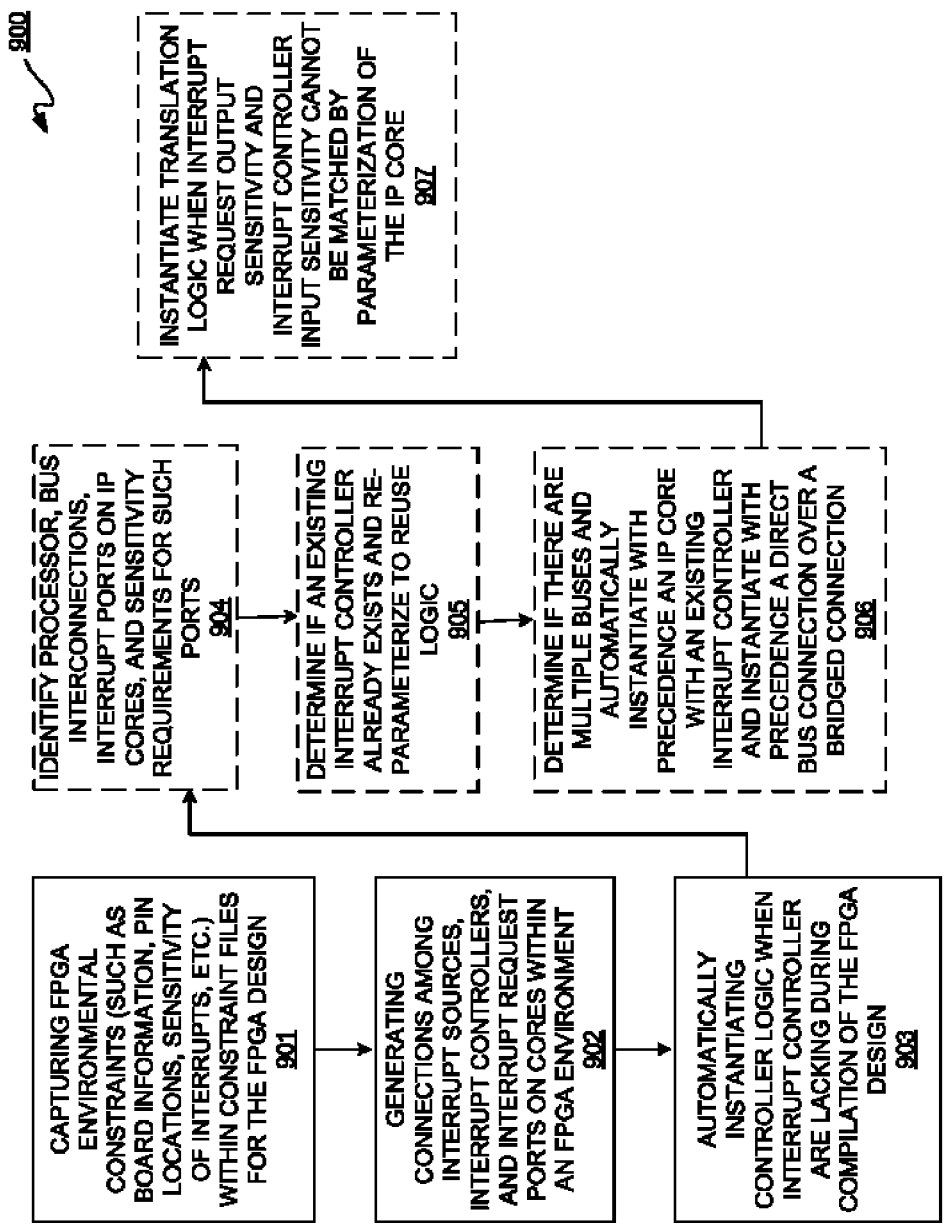
FIG. 10 is a flow chart illustrating a method of managing interrupt requests from IP cores within an FPGA design in accordance with an embodiment of the present invention.

Referring to FIG. 10, a flow chart illustrating a method 900 of managing interrupt requests from IP cores within an FPGA (or ASIC) design. Although the remainder of the description below is discussed with reference to an FPGA design, note that the applicability of the method can also involve ASIC designs as well. The method can include capturing environmental constraints within constraint files for the FPGA (or ASIC) design at step 901 (where the constraints can include information regarding a board upon which an FPGA is mounted, pin locations for interrupt signals, and the sensitivity of the interrupt signals), generating connections among interrupt sources, interrupt controllers, and interrupt request ports on microprocessor cores within an FPGA environment at step 902, and automatically instantiating controller logic when interrupt controllers are lacking during compilation of the FPGA design at step 903. The method at step 904 can also identify within the FPGA design processor and bus interconnections as well as each interrupt port on the IP cores and the sensitivity requirements for each port which can be stored within description files for a corresponding IP core instead of an HDL specification. Note, that automatically instantiating controller logic can be done by instantiating an interrupt controller for a predetermined bus for an IP core, instantiating connections between the interrupt controller to the predetermined bus, instantiating an interrupt input signal to the microprocessor core, and instantiating an interrupt request output on the IP core.

The method 900 can determine if an existing interrupt controller already exists for a predetermined bus between existing IP Cores and a main processor core at step 905 whereupon the method can further re-parameterize the existing interrupt controller to reuse existing logic to connect an additional unconnected IP core with the existing interrupt controller. Automatically instantiating controller logic can also involve instantiating an interrupt controller for a predetermined bus for multiple IP cores by instantiating a first IP core, instantiating connections between the interrupt controller to the predetermined bus, determining if the interrupt controller can be reused for additional IP cores, instantiating an interrupt input signal to the microprocessor core, and instantiating an interrupt request output on the multiple IP cores. In other embodiments, automatically instantiating controller logic can involve instantiating respective interrupt controllers for respective predetermined buses for multiple main processor cores, instantiating connections between the respective interrupt controllers to the respective predetermined buses, instantiating respective interrupt input signals to the respective main processor cores, and instantiating respective interrupt request outputs on multiple IP cores.

In yet other embodiments, the method 700 at step 906 can determine if there are multiple buses and automatically instantiate with precedence an IP core with an existing interrupt controller if an existing interrupt controller exists and automatically instantiates with precedence a direct bus connection over a bridged connection. At step 907, the method can alternatively or optionally instantiate translation logic when an interrupt request output sensitivity and an interrupt controller input sensitivity cannot be matched by parameterization of the IP core.

While the foregoing describes exemplary embodiment(s) in accordance with one or more aspects of the invention, other and further embodiment(s) in accordance with the one or more aspects of the invention may be devised without departing from the scope thereof, which is determined by the claim (s) that follow and equivalents thereof. Claim(s) listing steps do not imply any order of the steps.

What is claimed is:

1. A method of managing interrupt requests from a plurality of IP cores within an integrated circuit design, comprising:
   capturing environmental constraints within constraint files for the integrated circuit design;
   generating connections among interrupt sources, interrupt controllers, and interrupt request ports on microprocessor cores within an integrated circuit environment;
   determining that an IP core of the plurality of IP cores is adapted to generate an interrupt input signal; and
   automatically instantiating, using a computer during compilation of the integrated circuit design, an interrupt controller for receiving the interrupt input signal from the IP core if the interrupt controller is not available to the IP core.

2. The method of claim 1, wherein the integrated circuit environment described within the constraint files includes information regarding a board upon which an integrated circuit device is mounted, pin locations for interrupt signals, and the sensitivity of the interrupt signals.

3. The method of claim 1, wherein the method identifies within the integrated circuit design processor and bus interconnections.

4. The method of claim 1, wherein the method identifies each interrupt port on the IP cores and captures sensitivity requirements for each interrupt port for the IP cores.

5. The method of claim 4, wherein information for the interrupt ports and the sensitivity requirements are stored within description files for a corresponding IP core instead of an HDL specification.

6. The method of claim 1, wherein automatically instantiating an interrupt controller for receiving the interrupt input signal from the IP core comprises instantiating the interrupt controller for a predetermined bus for the IP core, instantiating connections between the interrupt controller and the predetermined bus, instantiating a connection for the interrupt input signal to a main microprocessor core, and instantiating a connection for an interrupt request output on the IP core.

7. The method of claim 1, wherein the method further determines if an existing interrupt controller already exists for a predetermined bus exists between existing IP Cores and a main processor core.

8. The method of claim 7, wherein the method further re-parameterizes the existing interrupt controller to reuse existing logic to connect an additional IP core with the existing interrupt controller.

9. The method of claim 1, wherein automatically instantiating an interrupt controller for receiving the interrupt input signal from the IP core comprises instantiating the interrupt controller for a predetermined bus for multiple IP cores by instantiating a first IP core, instantiating connections between the interrupt controller and the predetermined bus, determining if the interrupt controller can be reused for additional IP cores, instantiating a connection for the interrupt input signal to a main microprocessor core, and instantiating a connection for an interrupt request output on the multiple IP cores.

10. The method of claim 1, wherein automatically instantiating an interrupt controller for receiving the interrupt input signal from the IP core comprises instantiating respective interrupt controllers for respective predetermined buses for multiple main processor cores, instantiating connections between the respective interrupt controllers to the respective predetermined buses, instantiating connections for respective interrupt input signals to the respective main processor cores, and instantiating connections for respective interrupt request outputs on multiple IP cores.

11. The method of claim 1, wherein the method further determines if there are multiple buses and automatically instantiates with precedence an IP core with an existing interrupt controller and automatically instantiates with precedence a direct bus connection over a bridged connection.

12. The method of claim 1, wherein the method instantiates a translation circuit when an interrupt request output sensitivity and an interrupt controller input sensitivity cannot be matched by parameterization of the IP core.

13. A system, comprising a controller enabled to:
capture environmental constraints within constraint files for the integrated circuit design;
determine that an IP core of a plurality of IP cores is adapted to generate an interrupt input signal;
instantiate an interrupt controller circuit including at least one interrupt controller within hardware descriptions and software descriptions of an integrated circuit design; and
automatically instantiate connections for coupling the interrupt input signal to an interrupt controller input of the at least one interrupt controller if an interrupt controller is not available to the IP core.

14. The system of claim 13, further comprising detecting and reusing an existing interrupt controller.

15. The system of claim 13, further comprising instantiating connections for coupling the at least one interrupt controller to an interrupt input on a main processor of the integrated circuit design and instantiating connections for coupling an interrupt request output from an IP core to the at least one interrupt controller.

16. The system of claim 13, wherein the controller is enabled to:
generate connections among interrupt sources, interrupt controllers, and interrupt request ports on microprocessor cores within an integrated circuit environment; and
automatically instantiate, during compilation of the integrated circuit design, the at least one interrupt controller if an interrupt controller is not available to the IP core.

17. The method of claim 16, wherein the integrated circuit environment described within the constraint files includes information regarding a board upon which an integrated circuit device is mounted, pin locations for interrupt signals, and sensitivity of the interrupt signals.

18. The system of claim 16, wherein the controller identifies each interrupt port on the IP cores and captures sensitivity requirements for each interrupt port for the IP cores.

19. The system of claim 16, wherein the controller further determines if an existing interrupt controller already exists for a predetermined bus between existing IP Cores and a main processor core and re-parameterizes the existing interrupt controller to connect an additional IP core with the existing interrupt controller.

20. A non-transitory computer-readable medium, comprising computer instructions stored thereon, wherein the computer instructions when executed by a computer perform a method comprising:
capturing environmental constraints within constraint files for an integrated circuit design;
generating connections among interrupt sources, interrupt controllers, and interrupt request ports on microprocessor cores within an integrated circuit environment;
determining that an IP core of a plurality of IP cores is adapted to generate an interrupt input signal; and
automatically instantiating, during compilation of the integrated circuit design, an interrupt controller for receiving the interrupt input signal from the IP core if the interrupt controller is not available to the IP core.

* * * * *